United States Patent
Kim et al.

(10) Patent No.: US 7,589,149 B2
(45) Date of Patent: Sep. 15, 2009

(54) AQUEOUS POLY(UREA/URETHANES) DISPERSIONS USING POLYESTER GLYCOL

(75) Inventors: Young H. Kim, Hockessin, DE (US); Michael O'Neil, Middletown, DE (US); Jiazhong Chen, Boothwyn, PA (US)

(73) Assignee: INVISTA North America S.a r.l., Wilmington, DE (US)

( * ) Notice: Subject to any disclaimer, the term of this patent is extended or adjusted under 35 U.S.C. 154(b) by 1038 days.

(21) Appl. No.: 10/701,317

(22) Filed: Nov. 4, 2003

(65) Prior Publication Data

US 2004/0171745 A1    Sep. 2, 2004

Related U.S. Application Data

(60) Provisional application No. 60/423,478, filed on Nov. 4, 2002.

(51) Int. Cl.
    C08J 3/00      (2006.01)
    C08K 3/20      (2006.01)
    C08L 75/00     (2006.01)
    C08G 18/08     (2006.01)
    C08G 18/00     (2006.01)
    C08G 18/28     (2006.01)
    C08G 18/30     (2006.01)
    C08G 18/70     (2006.01)

(52) U.S. Cl. ............ 524/591; 524/589; 524/590; 524/839; 524/840; 528/44; 528/60; 528/65; 528/66; 528/71; 528/80; 528/83; 528/84; 528/85

(58) Field of Classification Search .......... 524/589, 524/590, 591, 839, 840; 528/44, 65, 85, 528/60, 66, 71, 80, 83, 84
See application file for complete search history.

(56) References Cited

U.S. PATENT DOCUMENTS

| | | | |
|---|---|---|---|
| 3,178,310 A | 4/1965 | Berger et al | |
| 3,419,533 A | 12/1968 | Dieterich et al. | |
| 3,479,310 A | 11/1969 | Dieterich et al. | |
| 3,919,173 A | 11/1975 | Coyner et al. | |
| 4,108,814 A | 8/1978 | Reiff et al. | |
| 4,127,513 A | 11/1978 | Bellis | |
| 4,139,567 A | 2/1979 | Pruckmayr | |
| 4,153,786 A | 5/1979 | Pruckmayr | |
| 4,228,272 A | 10/1980 | Del Pesco | |
| 4,235,751 A | 11/1980 | Del Pesco | |
| 4,292,226 A | 9/1981 | Wenzel et al. | |
| 4,303,774 A | 12/1981 | Nachtkamp et al. | |
| 4,431,763 A | 2/1984 | Reed | |
| 4,433,095 A | 2/1984 | Hombach | |
| 4,442,259 A | 4/1984 | Isgur et al. | |
| 4,444,976 A | 4/1984 | Rabito | |
| 4,501,852 A | 2/1985 | Markusch et al. | |
| 4,742,095 A | 5/1988 | Markusch et al. | |
| 5,494,960 A | 2/1996 | Rolando et al. | |
| 5,728,769 A * | 3/1998 | Natesh et al. | 524/591 |
| 5,905,113 A | 5/1999 | Licht et al. | |
| 5,997,969 A | 12/1999 | Gardon | |
| 5,998,540 A | 12/1999 | Lipkin et al. | |
| 6,248,415 B1 | 6/2001 | Pedain et al. | |

FOREIGN PATENT DOCUMENTS

| | | |
|---|---|---|
| DE | 83-3346136 | 7/1985 |
| DE | 86-3606479 | 9/1987 |
| DE | 19708451 | 9/1998 |
| WO | WO 02 08327 | 1/2002 |
| WO | WO 03 099891 | 12/2003 |

OTHER PUBLICATIONS

Kirk-Othmer Encyclopedia of Chemical Technology (4th Edition, vol. 10, pp. 624-638) John Wiley & Sons, Inc., New York, 1993.
B. K Kim, Colloid. Polym. Sc., 274:599-611, 1996.
J.M. Hammond, et al., J. Polym. Sci., Part A, vol. 9, p. 295 (1971).
Hongzhi Zhang, et al., J. Appl. Poly. Sci., vol. 73, p. 2303 (1999).

* cited by examiner

Primary Examiner—Patrick D Niland
(74) Attorney, Agent, or Firm—Christina W. Geerlof

(57) ABSTRACT

Stable aqueous poly(urea/urethane) polymers and dispersions are made that do not require the inclusion of chain extenders, curing agents or crosslinking agents.

7 Claims, 1 Drawing Sheet

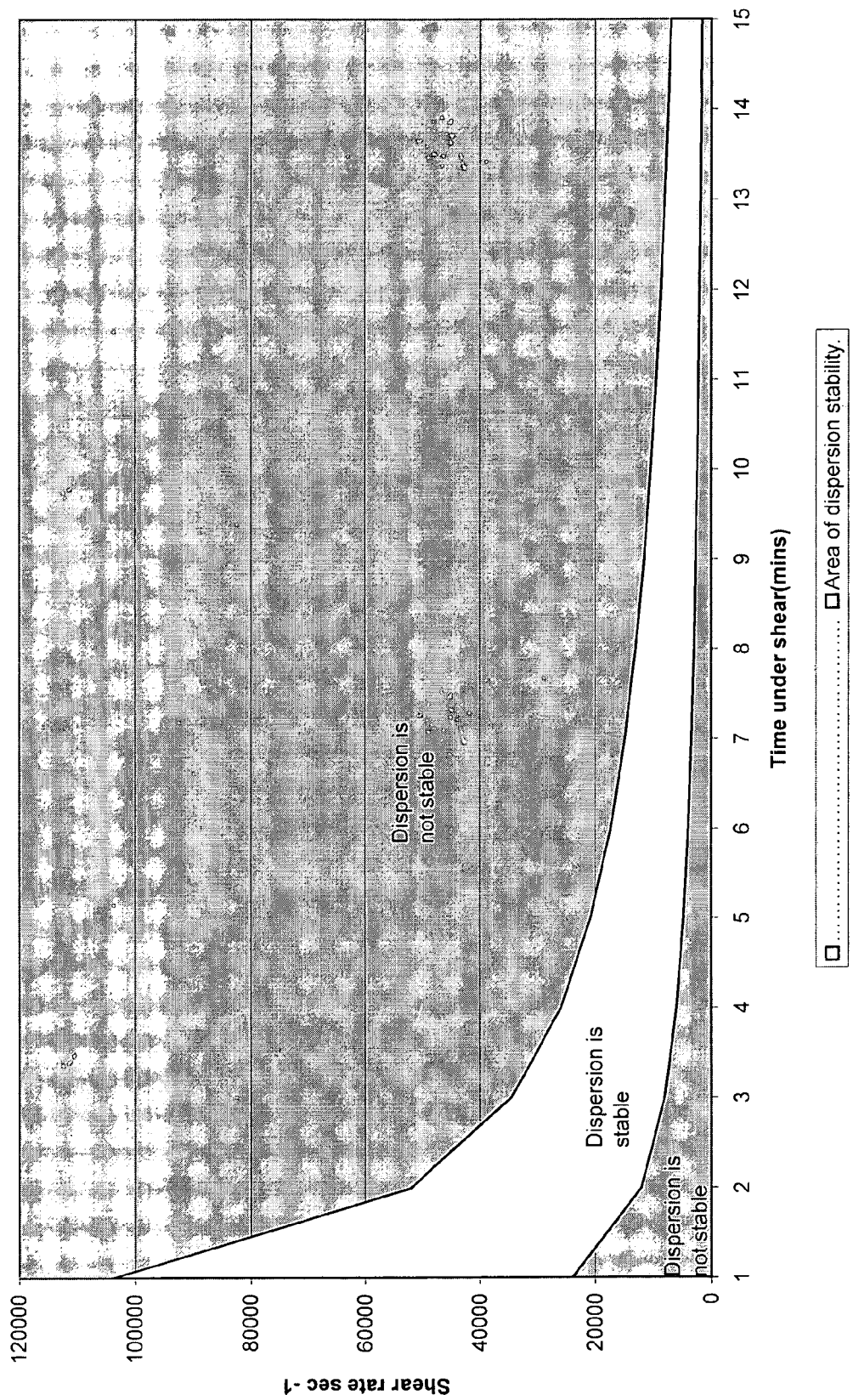
Figure 1: Dispersion stability chart for Aqueous Polyurethane Urea.

AQUEOUS POLY(UREA/URETHANES) DISPERSIONS USING POLYESTER GLYCOL

This application claims the benefit of U.S. Provisional Application No. 60/423,478, filed on Nov. 4, 2002, which is incorporated in its entirety as a part hereof for all purposes.

FIELD OF THE INVENTION

This invention involves a urethane polymer that does not include the residue of a chain extender, curing agent or crosslinking agent, and an aqueous dispersion made therefrom.

BACKGROUND OF THE INVENTION

The production of elastomeric materials is known in the art from sources such as *Kirk-Othmer Encyclopedia of Chemical Technology* (4th edition, Volume 10, Pages 624-638, John Wiley & Sons, Inc., New York, 1993). Many elastomeric materials contain a urethane bond that is prepared by reacting a hydroxy-terminated polyether or polyester with a ployisocyanate at a molar ratio of about 1:1.4 to 1:2.5 (polyol to polyisocyanate). This is typically followed by reaction of the resulting isocyanate-terminated prepolymer with a polyamine to produce a high molecular weight urea/urethane polymer. Small amounts of monofunctional amines may also be included to control polymer molecular weight. Mechanical properties in the final polymer may be modified by the choice of the polyether or polyester glycol, the diisocyanate, the polyamine, and the monoamine used; and they can also be modified by the choice of the polyol-diisocyanate molar ratio.

Long-chain elastomeric urethane polymer molecules are substantially linear block copolymers containing relatively long blocks in which molecular interactions are weak, interconnected by shorter blocks in which interactions are strong. The weakly interacting blocks, commonly referred to as soft segments, typically derive from the polyether or polyester glycol component whereas the blocks having strong interactions derive from polyisocyanate and chain extender reactions, and are referred to as hard segments. The chain extension reaction is usually a coupling reaction between an isocyanate terminus and an amino group of a polyamine, resulting in a urea linkage. Thus, the resulting polymer of the combined hard- and soft-segments typically results in a poly (urea/urethane).

Polymers as described above have been used to prepare aqueous urethane dispersions. A urethane dispersion my be prepared, for example, by chain extending the reaction product of an organic diisocyanate or polyisocyanate and an organic compound having two or more active hydrogen atoms (in either a hydroxy or amino terminus), often using a small amount of an organic solvent. As the diisocyanate is used in stoichiometric excess, the reaction product, which may be a urea/urethane prepolymer is isocyanate terminated. Examples of prepolymer preparations such as these are described in U.S. Pat. Nos. 3,178,310, 3,919,173, 4,442,259, 4,444,976, and 4,742,095, among others.

Urethane dispersions are reported as being useful for preparing such diverse materials as coatings and bonds (U.S. Pat. No. 4,292,226); flexible solvent barriers (U.S. Pat. No. 4,431, 763); adhesives (U.S. Pat. No. 4,433,095); and films (U.S. Pat. No. 4,501,852). Film applications include gloves, organ bags, condoms, ostomy bags, and the like. Conventional urethane dispersions have sometimes been found, however, to have insufficient physical or handling properties to make them a preferred material for such applications. Also, the use in the dispersion of certain relatively high-boiling solvents, such as N-methyl-2-pyrrolidone, can have adverse effects for some of these applications.

Despite the widespread use of aromatic polyisocyanates such as toluene diisocyanate (TDI), methylene diphenyidiisocyanate (MDI) and polymethylene polyphenylisocyanate (PMDI), an aliphatic polyisocyanate has sometimes been preferred for use in preparing an aqueous urethane dispersion. The aliphatic isocyanates, such as those disclosed in U.S. Pat. No. 5,494,960, are thought to have much higher stability toward hydrolysis while the prepolymer is dispersed in water. It is generally believed that, in such situation, a chain-extending reaction between an isocyanate and a polyamine takes place in a more controlled and predictable manner.

The reaction of a diisocyanate with a polyamine in water is, however, thought to be diffusion controlled, and it thus cannot be assured that all added polyamine is consumed during the reaction. Any unreacted polyamine remains with the polymer when it is fabricated from the disperion into a final product. When that product is intended for use in which it contacts human skin, the presence of such unreacted polyamines [such as ethylene diamine and other diamines as described in B. K. Kim, *Colloid. Polym. Sci.*, 274:599-611, 1996 ("Kim", which is incorporated in its entirety as a part hereof for all purposes)] may cause skin irritation or sensitivity for the user of the product. The presence of unreacted polyamines in a urethane dispersion can also cause an unpleasant odor in any product that is fabricated from the dispersion.

Films prepared from natural rubber latex are common, and are considered to have properties that are desirable from the perspective of comfort and utility. Unfortunately, natural rubber latex also includes proteins and other materials, such as sulfur containing curing agents, that can be irritating to the skin and may cause severe allergic reactions in some people.

Elastic films with good moisture management can provide protection from the environment, such as from germs and chemicals. Particularly with the increased potential threat from chemical and biological agents, the need of such materials is ever increasing. Recent incidents have shown need for comfortable gloves that can be worn by law enforcement and postal workers for a long period of time. Latex gloves usually have low puncture resistance, and moreover may pose additional health risks, including fatal allergic reactions by certain individuals. Nitrile gloves have good puncture resistance, but high modulus, so they can cause fatigue with long term use. Polyurethane elastomers may offer an alternative material choice, but some polyurethane gloves are found to get weak when exposed to water or rubbing alcohol. This would hinder the long term use of such gloves.

A need thus remains for urethane polymers that can be readily formed into, and fabricated from, a dispersion, and that, in the form of a fabricated article, have a reduced possibility of displaying characteristics that a user would find harmful or objectionable. Applicant has found that reducing or eliminating the content of unreacted polyamine in a urethane polymer results in the preparation of a urethane polymer that is useful for fabrication from a dispersion and yet has no tendency to cause skin irritation or to exude an unpleasant odor. Applicant has consequently proposed to reduce, and preferably eliminate, the content of unreacted polyamine in a urethane polymer by preparing the polymer without the use of a polyamine chain extender. Films formed from such polymers have been found to exhibit useful barrier properties toward water and some common alcoholic solvents, such as isopropanol, as well as useful mechanical properties such as low modulus at 100% elongation.

SUMMARY OF THE INVENTION

One embodiment of this invention is a urea/urethane polymer that includes (a) repeating units derived from a hydroxy-terminated copolymer prepared from tetrahydrofuran and one or both of an alkylene oxide and a cyclic acetal, and (b) repeating units derived from a polyisocyanate;

wherein the urea/urethane polymer contains less than about 2 mole percent of urea units described by the formula —R—N($R^2$)—C(O)—N($R^2$)—$R^1$—;

wherein R is an aromatic hydrocarbon radical, $R^1$ is an aliphatic hydrocarbon radical, and $R^2$ is H or an amide group that is described by the formula —C(O)—N($R^2$)—R—; and wherein the tetrahydrofuran is described by the formula

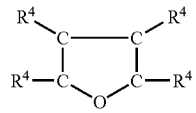

in which any one of the $R^4$s may be a $C_1$ to $C_4$ alkyl radical with the remaining $R^4$s being hydrogen.

Another embodiment of this invention is an ionomeric urea/urethane polymer that includes (a) repeating units derived from an aliphatic polyether polyol having a molecular weight of about 700 to about 1500, and (b) repeating units derived from a polyisocyanate, wherein the urea/urethane polymer contains less than about 2 mole percent of urea units described by the formula —R—N($R^2$)—C(O)—N($R^2$)—$R^1$—;

wherein R is an aromatic $C_6$-$C_{20}$ hydrocarbon radical, $R^1$ is an aliphatic $C_1$-$C_{20}$ hydrocarbon radical, and $R^2$ is H or an amide group that is described by the formula —C(O)—N($R^2$)—R—.

A further embodiment of this invention is an ionomeric urea/urethane polymer that includes (a) repeating units derived from an aliphatic polyester polyol, and (b) repeating units derived from a polyisocyanate, wherein the urea/urethane polymer contains less than about 2 mole percent of urea units described by the formula —R—N($R^2$)—C(O)—N($R^2$)—$R^1$;

wherein R is a $C_6$-$C_{20}$ aromatic hydrocarbon radical, $R^1$ is a $C_1$-$C_{20}$ aliphatic hydrocarbon radical, and $R^2$ is H or an amide group that is described by the formula C(O)—N($R^2$)—R—.

Yet another embodiment of this invention is a urethane polymer comprising a polyester polyol, DMPA and a diisocyanate that is free of, substantially free of, or contains less than 2 percent urea units described by —R—N($R^2$)—C(O)—N($R^2$)—$R^1$, wherein R is an aromatic radical, $R^1$ is an aliphatic radical and $R^2$ is H or amide groups which can be designated as C(O)—N($R^2$)—R—. This amide group can be formed by the reaction between the formed urea and yet unreacted with isocyanate. Formation of such a group, called a biuret, will result in branching or in some cases, crosslinking of the polymer. It is not essential to have a biuret group for aqueous dispersion, but such a group will affect the properties of the polymer formed.

Yet another embodiment of this invention is an aqueous urethane dispersion comprising a urethane polymer and a surfactant, as well as films comprising these urethane polymers. The films produced from these dispersions exhibit barrier properties toward water and some common alcoholic solvents, such as isopropanol, as well as mechanical properties such as low modulus at 100% elongation, which is related to comfort at uses under low elongation.

Yet another embodiment of this invention is a process for making these dispersions, comprising the steps of (a) mixing an isocyanate-containing moiety with a glycol-containing moiety at between 80 and 100° C.; and (b) adding an isocyanate-terminated glycol-containing moiety to a mixture of water and surfactant at a temperature of about 0° C. to 10° C. with a mixer imparting a shear force of between 500 and 1700 Newtons for a period of time of about 2 to 5 minutes; and (c) obtaining a dispersion with a solids content of 10 to 60% by weight.

BRIEF DESCRIPTION OF THE DRAWING

FIG. 1 is a plot of shear rate (in $sec^{-1}$) versus shear time (in minutes) for the preparation of an aqueous poly(urea/urethane) dispersion.

DETAILED DESCRIPTION OF THE INVENTION

This invention discloses the preparation of a stable aqueous poly(urea/urethane) dispersion, which are included in the materials sometimes referred to herein as "urethane" polymers or dispersions. The dispersion is based on the use of a polyether homo- and/or copolymer, or a polyester, as a glycol, and an aromatic polyisocyanate, but does not require the use of a typical chain extending agent such as a polyamine, a curing agent or a crosslinking agent. In the dispersion process, a stable colloidal particle of elastomeric polyurethane is generated, which has a wide utility.

Typically, for the generation of an aqueous colloid of polyurethane, an aliphatic polyisocyanate is preferred. (See, generally, Kim.) These aliphatic polyisocyanates are reacted with various glycols to form oligomeric prepolymers, which are then dispersed into water that contains an equivalent amount of diamine. The amount of diamine is added by equivalence to percent NCO in the prepolymer, as determined by n-butylamine titration and back calculation. The aliphatic polyisocyanates have relatively high stability in water so that the diamine reacts with the isocyanate to chain extend the prepolymer through urea linkages.

It has been found, however, that in the urethane polymers and urethane dispersions of this invention, isocyanate groups undergo hydrolysis to form —$NH_2$ groups. These —$NH_2$ groups subsequently react with other isocyanate groups to form urea bonds in an amount that forms high polymers (e.g., molecular weights that are adequate for free standing film formation—typically above 100,000 and preferably above 200,000), and this occurs without need for the addition of common polyamines, such as ethylene diamine and other diamines as described in Kim. This is important because the reaction of an isocyanate group with polyamine in water is diffusion controlled, and it cannot be assured that all added polyamine is consumed during the reaction. Any unreacted polyamine, which remains in the material during further fabrication, can cause skin irritation or sensitivity in the eventual use of certain products.

Omitting a polyamine chain extender from the reaction to form the poly(urea/urethane) enables the production of a polymer or contains less than about 2 mole percent, preferably less than about 1 mole percent, and more preferably less than about 0.5 mole percent of urea units as described by the formula —R—N($R^2$)—C(O)—N($R^2$)—$R^1$—; wherein R is an aromatic hydrocarbon radical, $R^1$ is an aliphatic hydrocarbon radical, and $R^2$ is H or an amide group that is described by the formula —C(O)—N($R^2$)—R—. In a further embodiment, the polymer is free of, substantially free of, the urea units as described above, and is substantially free of such urea units when the content of unreacted polyamine in the polymer is sufficiently low that the presence of such amount of polyamine does not cause any undesirable smell in the product, or any undesirable skin reaction for the user of a film product made therefrom.

It has also been found in the urethane polymers and dispersions of this invention that the polyisocyanate need not be limited to an aliphatic polyisocyanate, and that aromatic polyisocyanates are suitable for use herein. Examples of suitable polyisocyanates to be used in preparing the isocyanate-terminated prepolymers in accordance with the present invention are organic diisocyanates represented by the general formula $R^{10}(NCO)_2$ in which $R^{10}$ represents an organic group obtainable by removal of the isocyanate groups from an organic diisocyanate having a molecular weight of from about 112 to 1,000, and preferably from about 140 to 400. Diisocyanates preferred for the process according to the invention are those represented by the general formula indicated above in which $R^{10}$ represents a divalent aliphatic hydrocarbon group having from 4 to 18 carbon atoms, a divalent cycloaliphatic hydrocarbon group having from 5 to 15 carbon atoms, a divalent araliphatic hydrocarbon group having from 7 to 15 carbon atoms or a divalent aromatic hydrocarbon group having 6-15 carbon atoms. Examples of the organic diisocyanates which are particularly suitable for the process include tetramethylene diisocyanate, 1,6-hexamethylene diisocyanate, dodecamethylene diisocyanate, cyclohexane-1,3- and -1,4-diisocyanate, 1-isocyanato-3-isocyanatomethyl-3,5,5-trimethylcyclohexane(isophorone diisocyanate or IPDI), bis-(4-isocyanatocyclohexyl)-methane, 1,3- and 1,4-bis(isocyanatomethyl)-cyclohexane, bis-(4-isocyanato-3-methyl-cyclohexyl)-methane, 2,4-diisocyanatotoluene, 2,6-diisocyanatotoluene, mixtures of these isomers, 4,4'-diisocyanato diphenyl methane and its isomeric mixtures with 2,4'- and optionally 2,2'-diisocyanato diphenylmethane, and 1,5-diisocyanato naphthalene. Mixtures of diisocyanates can, of course, be used. Preferred diisocyanates are 1,6-hexamethylene diisocyanate, isophorone diisocyanate, bis-(4-isocyanatocyclohexyl)-methane, 2,4- and/or 2,6-diisocyanatotoluene and 4,4'- and/or 2,4'-diisocyanato diphenylmethane.

It is preferred to use in the urea/urethane polymers and dispersions hereof a hydrophilic soft segment having a polarity that enhances formation of the dispersion. In one embodiment, such a soft segment may be formed from a hydroxy-terminated copolymer prepared from tetrahydrofuran and one or both of an alkylene oxide and a cyclic acetal. The alkylene oxides used to prepare such a copolymer may be those containing 2 or 3 carbon atoms in the alkylene oxide ring. The alkylene oxide can be unsubstituted or substituted with, for example, alkyl groups, aryl groups or halogen atoms. Illustrative of such alkylene oxides lo are ethylene oxide and 1,2-propylene oxide, with ethylene oxide (EO) being preferred. The cyclic acetals that can be used as comonomers are those represented by a structure such as the following

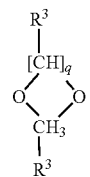

in which q is 2 to 4, and each $R^3$ is independently hydrogen or methyl. The tetrahydrofurans that can be used as comonomers are those represented by a structure such as the following

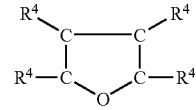

in which any one of the $R^4$s may be a $C_1$ to $C_4$ alkyl radical with the remaining $R^4$s being hydrogen. In the preferred tetrahydrofuran (THF), however, all $R^4$s are hydrogen.

The portion of this copolymer derived from the alkylene oxide and/or cyclic acetal may be greater than about 20 percent by weight, and is preferably about 25 to about 60 percent by weight. This copolymer may have a molecular weight of about 1000 to about 3500, and preferably has a molecular weight of about 1500 to about 2500. These copolymers may be prepared by a process that employs a polymeric catalyst prepared from monomers such as trifluorovinyl sulfonic acid, linear or branched-chain vinyl monomers containing α-fluoro sulfonic acid group precursors, and perfluoroalkylvinly ethers α-fluoro sulfonic acid group precursors. The process may be run at temperatures ranging from ambient to 80° C., or at higher temperatures under a pressure of up to 5000 atmospheres. The reaction is preferably run in an inert atmosphere such as nitrogen. If the copolymer is ester end-capped as prepared, it may be converted to a copolyether glycol by alcoholysis. Suitable soft segment copolymers, and methods for their preparation, are further described in sources such as U.S. Pat. Nos. 4,127,513, 4,139,567, 4,153,786, 4,228,272 and 4,235,751; DE 86-3606479 and DE 83-3346136; J. M. Hammond et al, *J. Polym. Sci.*, Part A, Vol. 9, page 295 (1971); and Hongzhi Zhang et al, *J. Appl. Polym. Sci.*, Vol. 73, page 2303 (1999).

In another embodiment of this invention, the urea/urethane polymer is an ionomeric polymer, and the soft segment of the polymer and a dispersion thereof may be derived from an isocyanate-reactive ionic or potentially ionic compound, and either an aliphatic polyester polyol or a low molecular weight aliphatic polyether polyol.

Suitable polyester polyols include the reaction products of aliphatic dihydric alcohols and aliphatic dibasic carboxylic acids, either or both of which may be, for example, a $C_2$ to $C_{12}$ molecule. Other examples of the dihydrioc alcohols suitable for use for such purpose include ethylene glycol, trimethylene glycol, 1,4-butanediol, 1,5-pentanediol, 1,6-hexanediol, diethylene glycol, propylene glycol and neopentyl glycol; polyether compounds such as polyethylene glycol, polypropylene glycol and polybutylene glycol; diols of alicyclic hydrocarbons such as 1,3-cyclohexanedimethanol, and 1,4-cyclohexane-dimethanol.

Other examples of dicarboxylic acids suitable for use for such purpose include dicarboxylic acid units derived from aliphatic dicarboxylic acids such as succinic acid, glutaric acid, adipic acid, pimellic acid, suberic acid, azelaic acid, sebacic acid, decanedicarboxylic acid, dodecanedicarboxylic acid, cyclohexanedicarboxylic acid, norbornanedicarboxylic acid, tricyclodecane-dicarboxylic acid and pentacyclododecanedicarboxylic acid. Instead of free dicarboxylic acids, the corresponding dicarboxylic acid anhydrides or dicarboxylic acid esters of lower alcohols or mixtures thereof may be used for preparing the polyesters.

The dihydric alcohol and the diacid units may each be contained within the polyester resin in an amount of about 5 to about 95 mole percent. The process for producing polyester resins is not particularly limited and a conventional process can be applied. Examples of the process include the melt polymerization processes such as the transesterification process and the direct esterification process, the solution polymerization process and the solid polymerization process.

Useful polyester polyols, hydroxyl terminated linear polyesters, include for example Uniroyal Chemical Company's Fomreze® products: Fomrez® G24-56 [2000 Mw, hydroxyl terminated linear polyester, poly(ethylene/butylene adipate) glycol using a 60/40 molar ratio of ethylene glycol/1,4-butane diol], Fomrez® G24-112 [1000 Mw, hydroxyl terminated linear polyester, poly(ethylene/butylene adipate)glycol using a 60/40 molar ratio of ethylene glycol/1,4-butane diol], and Fomrez® 22-56 (2000 Mw, hydroxyl terminated saturated linear polyester using poly(ethylene adipate)glycol]. The polyester polyol may thus be a dihydroxy-terminated polymer such as those selected from the group consisting of an ethylene adipate, a butylene adipate, an ethylene/butylene adipate, and mixtures thereof.

Suitable polyether polyols are those represented by a formula such as HO—[(CR$^6$H)$_m$—O—]$_n$—H, wherein R$^6$ is hydrogen, a halogen or a C$_1$ to C$_4$ alkyl radical; m is 3 or 4; and n is in the range of about 8 to about 20, or is more preferably in the range of about 11 to about 17. These polyols may have a molecular weight in the range of about 700 to about 1500, or preferably in the range of about 900 to about 1150. A suitable polyether polyol is a Terethane® brand polytetramethyleneetherglycol (PTMEG) available commercially from DuPont.

The urethane polymer in this embodiment is referred to as ionomeric because it contains the ionic or potentially ionic compound. The ionic or potentially ionic compound is a hydrophilic compound that provides ionic (e.g. anionic or cationic) functionality to the urethane polymer and facilitates formation of a dispersion by acting as an internal emulsifier. The compound is isocyanate-reactive as it contains at least two atoms, such as oxygen or nitrogen, that are capable of reacting with an isocyanate group and from which the active hydrogens are removed as a result of the mechanism of the reaction involving the isocyanate group.

The ionic or potentially ionic groups are chemically incorporated into the poly(urea/urethane). The ionic or potentially ionic groups are incorporated in an amount sufficient to provide an ionic group content of up to about 120 milliequivalents, preferably about 10 to 80 milliequivalents, more preferably about 10 to 60 milliequivalents, and most preferably about 10 to 30 milliequivalents per 100 g of poly(urea/urethane).

Suitable compounds for incorporating these groups include (1) monoisocyanates or diisocyanates which contain ionic or potentially ionic groups, and (2) compounds which are monofunctional or difunctional in the isocyanate-polyaddition reaction and contain ionic or potentially ionic groups. The potentially ionic groups or their corresponding ionic groups may be cationic or anionic, although the anionic groups are preferred. Examples of anionic groups include —COO$^-$ and —SO3$^-$. Examples of cationic groups include

These ionic groups are formed by neutralizing the corresponding potentially ionic groups either prior to, during or after forming the isocyanate-terminated prepolymer. When the potentially ionic groups are neutralized prior to forming the isocyanate-terminated prepolymer, the ionic groups are incorporated directly. When neutralization is preformed subsequent to forming the prepolymer, potentially ionic groups are incorporated.

Suitable compounds for incorporating the previously discussed carboxylate, sulfonate and quaternary nitrogen groups are described in U.S. Pat. Nos. 3,479,310, 4,303,774 and 4,108,814. Suitable compounds for incorporating tertiary sulfonium groups are described in U.S. Pat. No. 3,419,533. The neutralizing agents for converting the potentially ionic groups to ionic groups are also described in those patents. Within the context of this invention, the term "neutralizing agents" is meant to embrace all types of agents which are useful for converting potentially ionic groups to ionic groups. Accordingly, this term also embraces quaternizing agents and alkylating agents.

The preferred sulfonate groups for incorporation into the isocyanate-terminated prepolymers are the diol sulfonates disclosed in U.S. Pat. No. 4,108,814. Suitable sulfonates also include those described as follows:

H$_2$N—CH$_2$—CH$_2$—NH—(CH$_2$)$_r$—SO$_3$Na, where r=2 or 3; and HO—CH$_2$—CH$_2$—C(SO$_3$Na)H—CH$_2$—OH. The preferred carboxylate groups for incorporation into the isocyanate-terminated prepolymer are derived from hydroxy-carboxylic acids of the general formula (HO)$_x$R$^7$(COOH)$_y$, wherein R$^7$ represents a straight or branched hydrocarbon radical containing 1 to 12 carbon atoms, and x and y each independently represents values from 1 to 3. Examples of these hydroxy-carboxylic acids include citric acid and tartaric acid.

The preferred acids are those of the above-mentioned formula wherein x=2 and y=1. These dihydroxy alkanoic acids are described in U.S. Pat. No. 3,412,054. The preferred group of dihydroxy alkanoic acids are the α,α-dimethylol alkanoic acids represented by the structural formula R$^9$—C—(CH$_2$OH)$_2$—COOH, wherein R9 is hydrogen or an alkyl group containing 1 to 8 carbon atoms. The most preferred dihydroxy alkanoic acids is 2,2' dimethanolpropionic acid ("DMPA"). Suitable carboxylates also include
H$_2$N—(CH$_2$)$_4$—C(CO$_2$H)H—NH$_2$+base, and
H$_2$N—CH$_2$—CH$_2$—NH—CH$_2$—CH$_2$—CO$_2$Na.

In addition the foregoing, cationic centers such as tertiary amines with one alkyl and two alkylol groups may also be used as the ionic or potentially ionic group.

In order to convert the preferred potential anionic groups to anionic groups either before, during or after their incorporation into the prepolymers, either volatile or nonvolatile cations are used to form the counterions of the anionic groups. Volatile cations are those wherein at least about 90% of the basic organic compounds used to form the counterion of the anionic group volatilize under the conditions used to cure films formed from the poly(urea/urethane) dispersions, preferably at least about 90% of the basic organic compounds volatilize when films formed from the poly(urea/urethane) dispersions are cured under ambient conditions. Nonvolatile cations are those wherein at least about 90% of the cations do not volatilize under the conditions used to cure films formed from the poly(urea/urethane) dispersions, preferably at least about 90% of the cations do not volatilize when films formed from the polyurethane-urea dispersions are cured under ambient conditions. As the amount of counterions formed from volatile basic organic compounds increases, the resistance to water swell of coatings or films prepared from the aqueous polyurethane-urea dispersions is further improved; whereas, as the amount of counterions formed from nonvolatile cations increases, the hydrolytic stability of films or coatings prepared from the aqueous polyurethane-urea dispersions is further improved. Therefore, it is possible to control the properties of the finally produced coatings or films by simply controlling the ratio between the volatile and nonvolatile cations used to form the counterions of the anionic groups.

Suitable volatile basic organic compounds for neutralizing the potential anionic groups are the primary, secondary or tertiary amines. Of these the trialkyl-substituted tertiary amines are preferred. Examples of these amines are trimethyl amine, triethyl amine, triisopropyl amine, tributyl amine, N,N-dimethyl-cyclohexyl amine, N,N-dimethylstearyl amine, N,N-dimethylaniline, N-methylmorpholine, N-ethylmorpholine, N-methylpiperazine, N-methylpyrrolidine, N-methylpiperidine, N,N-dimethyl-ethanol amine, N,N-diethyl-ethanol amine, triethanolamine, N-methyldiethanol amine, dimethylaminopropanol, 2-methoxyethyidimethyl amine, N-hydroxyethylpiperazine, 2-(2-dimethylaminoethoxy)-ethanol and 5-diethylamino-2-pentanone. The most preferred tertiary amines are those which do not contain active hydrogen(s) as determined by the Zerewitinoff test since they are capable of reacting with the isocyanate groups of the prepolymers which can cause gelation, the formation of insoluble particles or chain termination.

When triethyl amine is used as a base, using less than one equivalent of amine to the acid, to minimize any potential odor, is recommended. The dispersing water generally contains less than one equivalent of base to neutralize the acid, wherein the pH of the 1 mole aqueous solution does not exceed 10.

Suitable nonvolatile cations also include monovalent metals, preferably alkali metals, more preferably lithium, sodium and potassium and most preferably sodium. These cations may be used in the form of inorganic or organic salts, preferably salts wherein the anions do not remain in the dispersions such as hydrides, hydroxides, carbonates or bicarbonates. When an acid-containing diol, for example, is used as the ionic group, a relatively mild inorganic base such as $NaHCO_3$, $Na(CO_3)_2$, NaAc (where Ac represents acetate), $NaH_2PO_4$ and the like will assist in improving the dispersion. These inorganic bases are relatively low in odor, and also tend not to be skin irritants.

When the potential cationic or anionic groups of the prepolymer are neutralized, they provide hydrophilicity to the prepolymer and better enable it to be stably dispersed in water. The neutralization steps may be conducted (1) prior to prepolymer formation by treating the component containing the potentially ionic group(s), or (2) after prepolymer formation, but prior to dispersing the prepolymer. The reaction between the neutralizing agent and the potential anionic groups may be conducted between about 20° C. and about 150° C., but is normally conducted at temperatures below about 100° C., preferably between about 30° C. and about 80° C., and most preferably between about 50° C. and about 70° C., with agitation of the reaction mixture. The ionic or potentially ionic group may be used in amount of about 3 to about 5 percent by weight.

In the discussion above of the ionic and potentially ionic groups, the patents there mentioned and U.S. Pat. No. 4,742,095 is each incorporated in its entirety as a part hereof for all purposes.

The isocyanate-terminated prepolymers of the present invention are prepared by reacting the polyisocyanate component with the polyol component, and, in the embodiments where used, the component containing at least one ionic group or at least one potentially ionic group. The potentially ionic groups are groups which may be converted to ionic groups by treatment with neutralizing agents. The ratio of isocyanate groups to isocyanate-reactive groups is maintained between about 1.1 to 3, preferably about 1.2 to 2 and most preferably about 1.3 to 1.5 on an equivalent basis. The above components may be reacted simultaneously or sequentially to produce the isocyanate-terminated prepolymer. Simultaneous reaction will lead to the production of random copolymers, whereas a sequential-type reaction will lead to the production of block copolymers. The order of addition of the compounds containing isocyanate-reactive hydrogen(s) in the sequential-type reaction process is not critical; however, during the reaction of these compounds it is especially preferred to maintain an excess of isocyanate groups in order to control the molecular weight of the prepolymer and prevent high viscosities.

The reaction temperature during prepolymer production is normally maintained below about 150° C., preferably between about 50° C. and about 130° C. The reaction is continued until the content of unreacted isocyanate groups decreases to the theoretical amount or slightly below. The finished prepolymer should have a free isocyanate content of about 1 to about 8 percent, preferably about 1 to about 5 percent, and more preferably about 2 to about 4 percent by weight, based on the weight of prepolymer solids.

It is possible to conduct the prepolymer reaction in the presence of catalysts known to accelerate the reaction between isocyanate groups and isocyanate-reactive groups, such as an organo-tin compound or a tertiary amines; however, the use of a catalyst is generally not necessary, and it is often preferred to conduct the reaction without a catalyst.

In one embodiment, the dispersions of the current invention are made by mixing an isocyanate and glycol for several hours under nitrogen at a temperature in the range of about 80° C. to about 100° C. to form a prepolymer. The shear rate and force to which the dispersion mixture is subjected is important, and is described in FIG. 1. If too much shear force is applied, the dispersion can become unstable and break apart. Generally, the preferred range of shear force is between 500 and 1700 Newtons during a mixing time that is generally between 2 and 5 minutes. In other embodiments a shear rate in the range of about 19000 to about 48000 $sec^{-1}$ may be used during a mixing time that is generally between 2 and 7 minutes.

At the end of the mixing time, the amount of excess isocyanate in the prepolymer can be determined by n-butylamine titration and back calculation. After the reaction product is cooled to room temperature, solvents [generally water miscible organic solvents such as acetone and methyl ethyl ketone (MEK)] can optionally be used to dilute the prepolymer to approximately a 75% weight percent solution.

This solution is then pumped into a chilled aqueous solution that contains a surfactant, which is a molecule composed of groups of opposing solubility tendencies, i.e. one or more groups have an affinity for the phase in which the molecule or ion is dissolved, and one or more groups are antipathic to that medium. Surfactants are classified according to the charge on the surface-active moiety. In anionic surfactants, this moiety carries a negative charge; in a cationic surfactant, the charge is positive; in a nonionic surfactant, there is no charge on the molecule and the solubilizing effect may be supplied, for example, by hydroxyl groups or a long chain of ethylene oxide groups; and in an amphoteric surfactant, the solubilizing effect is provided by both positive and negative charges in the molecule. Hydrophilic, solubilizing groups for anionic surfactants include carboxylates, sulfonates, sulfates (including sulfated alcohols and sulfated alkyl phenols), phosphates (including phosphate esters), N-acylsarcosinates, and acylated protein hydrolysates. Cationics are solubilized by amine and ammonium groups. In addition to polyoxyethylene, nonionic surfactants include a carboxylic acid ester, an anhydrosorbitol ester, a glycol ester of a fatty acid, an alkyl polyglycoside, a carboxylic amide, and a fatty acid glucamide. Any of the above described surfactants or equivalents are suitable, but a particularly suitable surfactant is sodium dodecylbenzenesulfonate. A surfactant may be used in an amount of about 0.1 to about 2 percent by weight, and preferably in an amount of about 0.5 to about 1 percent by weight.

The dispersion temperature is important for the small particle formation. The preferred dispersion temperature is about 0 to about 10° C. The solid content of the dispersion is about 10-60%, and typically 10-30%.

The final product is a stable, aqueous dispersion of poly (urea/urethane) particles having a solids content of up to about 60% by weight, preferably about 10-60% by weight, and most preferably about 30-45% by weight. However, it is always possible to dilute the dispersions to any minimum solids content desired. The solids content of the resulting dispersion may be determined by drying the sample in an oven at 100° C. for 2 hours and comparing the weights before and after drying. The particle size is generally below about 1.0 micron, and preferably between about 0.01 to 0.5 micron. The average particle size should be less than about 0.5 micron, and preferably between 0.01 to 0.3 micron. The small particle size enhances the stability of the dispersed particles Fillers, plasticizers, pigments, carbon black, silica sols and the known levelling agents, wetting agents, antifoaming agents, stabilizers, and other known additives, may also be incorporated into the dispersions.

These dispersions find wide utility in uses such as fabric coating, elastic film formation, fiber sizing, and the like. The dispersions may, if desired, be processed into films permeable to water vapor. Examples of end-use articles fabricated from films formed from these dispersions include gloves for all medical, sanitary, hygiene and personal protection related uses, finger cots, condoms, ostomy bags, organ bags and the like. These film-based items show improved solvent resistance when compared to items made from other materials.

The dispersions of this invention are also suitable for coating and impregnating woven and non-woven textiles, leather, paper, wood, metals, ceramics, stone, concrete, bitumen, hard fibers, straw, glass, porcelain, plastics of a variety of different types, glass fibers of antistatic and crease-resistant finishing; as binders for nonwovens, adhesives, adhesion promoters, laminating agents, hydrophobizing agents, plasticizers; as binders, for example, for cork powder or sawdust, glass fibers, asbestos, paper-like materials, plastics or rubber waste, ceramic materials; as auxiliaries in textile printing and in the paper industry; as additives to polymers as sizing agents, for example, for glass fibers; and for finishing leather.

The dispersions may also be applied to a porous substrate which subsequently remains bonded to the end product, such as woven or nonwoven textile structures and fiber mats, felts or nonwovens, also paper webs, foam sheeting or split leather which by virtue of their absorbing action cause the coating to harden immediately. This is followed by drying and, optionally, pressing at elevated temperatures However, drying may also be carried out on smooth, porous or nonporous materials, for example, metal, glass, paper, cardboard, ceramic materials, sheet steel, silicone rubber, aluminum foil, the end sheet structure subsequently being lifted off and used as such, or applied to a substrate using the reversal process by bonding, flame lamination or calendering. Application by the reversal process may be carried out at any time.

These polyurethane dispersions are also suited for coatings on vinyl fabrics used in automotive seating and commercial upholstery. In these application areas, properties like plasticizer barrier effect, improved abrasion resistance and good hydrolytic and UV-resistance are of importance. They are also useful as coatings for textiles such as tarpaulins, such as for military applications where properties like excellent toughness and retained properties after aging are essential.

The following examples illustrate but do not limit the invention. The particularly advantageous features of the invention may be seen in contrast to the comparative examples, which do not possess the distinguishing characteristics of the invention.

Unless otherwise specified, all chemicals and reagents were used as received from Aldrich Chemical Company, Milwaukee, Wis. Various chemicals and reagents are referred to below by the following abbreviations:

| MDI | 4,4'-diphenylmethane diisocyanate |
|---|---|
| NCO | Isocyanate group |
| DMPA | 2,2'-Bis(hydroxymethyl)propionic acid |
| MEK | Methylethyl ketone (2-butanone) |
| TEA | Triethylamine |
| SDBS | Sodium dodecylphenylsulfate |
| F24-112 | Fomrez ® G24-112 (Uniroyal Chemical Co.), a hydroxyl terminated linear polyester - poly(ethylene/butylene adipate)glycol using a 60/40 molar ratio of ethylene glycol/1,4-butane diol. |

Materials

All the glycols were dried at 90° C. under vacuum for 12 h before use. MDI was purified by heating to 50° C. DMPA, MEK, TEA and SDBS were purchased and were used without further purification.

Mixers used to make dispersion are IKA® mixer, model T25 BASIC SI, IKA®Works, Inc and Ross mixer/emulsifier, model HSM-100LC, Charles Ross and Son Company. The IKA® mixer was operated at 11,000 rpm, and the Ross mixer was operated between 7,000 and 8,000 rpm.

General Procedure to Prepare Aqueous-Polyurethane Dispersion

Prepolymer was prepared by mixing MDI, glycol (and DMPA if necessary) at 90° C. for 3-5 h under nitrogen. The amount of excess NCO remained after the coupling reaction was determined by titration. When a solvent was used to dilute the prepolymer, a solvent was added typically to make a 75% weight solution after the reaction product was cooled to room temperature. The prepolymer was placed into a tube and was slowly added into chilled aqueous solution containing surfactant and occasionally base via pneumatic air pump. Solids content of the dispersion is about 10-30%.

EXAMPLE 1

156.4 g (0.624 mole) of MDI was mixed with 391 g (0.391 mole) F24-112 glycol and 19.9 g (0.149 mole) DMPA (make 3.5 wt % of total) in a three-neck round bottom flask in dry box. The flask was then moved into hood and equipped with an overhead stirrer. The mixture was stirred under nitrogen at 90° C. for 4 h. Titration of the mixture shows the NCO content is 5.4%.

200 ml of MEK was added into this mixture and makes a solution of 74% solids in MEK. 285 g of glycol/MEK solution was then slowly added via caulking tube into 1.2 liters of 2% SDBS solution with 7.13 ml of TEA at 0° C. The ratio of TEA to DMPA is 1:1. The dispersion was made with Ross mixer and small amount of precipitate was observed. A final 9.9% dispersion of solids content was obtained after precipitate was filtered.

COMPARATIVE EXAMPLE A

A mixture was prepared as described above in Example 4, but NaHCO$_3$ was used as the base and no SDBS was added. No dispersion resulted.

COMPARATIVE EXAMPLE B

A mixture was prepared as described above in Example 4, but NaHCO$_3$ was used as the base, and 0.5% SDBS solution was used. Precipitation was observed. A 2% solids dispersion was made after the precipitate was filtered off.

What is claimed is:

1. An ionomeric urea/urethane polymer comprising (a) repeating units derived from an aliphatic polyester polyol, and (b) repeating units derived from a polyisocyanate, wherein the urea/urethane polymer contains less than about 2 mole percent of urea units described by the formula —R—N(R$^2$)—C(O)—N(R$^2$)—R$^1$;

wherein R is a C$_6$-C$_{20}$ aromatic hydrocarbon radical, R$^1$ is a C$_1$-C$_{20}$ aliphatic hydrocarbon radical, and R$^2$ is H or an amide group that is described by the formula C(O)—N(R$^2$)—R—; and wherein the polyisocyanate is selected from the group consisting of toluene diisocyanate, methylene diphenyldiisocyanate, polymethylene polyphenylisocyanate, and mixtures thereof.

2. A urea/urethane polymer according to claim 1 which comprises repeating units derived from an ionic compound or a potentially ionic compound.

3. A urea/urethane polymer according to claim 2 wherein the ionic compound or potentially ionic compound comprises a hydroxy-carboxylic acid of the general formula (HO)$_x$R$^7$(COOH)$_y$, wherein R$^7$ represents a straight or branched hydrocarbon radical containing 1 to 12 carbon atoms, and x and y each independently represents values from 1 to 3.

4. A urea/urethane polymer according to claim 2 wherein the ionic compound or potentially ionic compound comprises 2,2' dimethanolpropionic acid.

5. A urea/urethane polymer according to claim 1 wherein the polyester polyol is a dihydroxy-terminated polymer selected from the group consisting of an ethylene adipate, a butylene adipate, an ethylene/butylene adipate, and mixtures thereof.

6. A urea/urethane polymer according to claim 1 wherein the urea/urethane polymer contains less than about 1 mole percent of the described urea units.

7. An aqueous dispersion of a urea/urethane polymer wherein the urea/urethane polymer comprises a polymer according to claim 1 and a surfactant.

* * * * *